(12) United States Patent
Kim et al.

(10) Patent No.: US 10,778,774 B2
(45) Date of Patent: Sep. 15, 2020

(54) METHOD AND APPARATUS FOR MANAGING URBAN INFRASTRUCTURES USING INTERNET OF THINGS

(71) Applicant: ELECTRONICS AND TELECOMMUNICATIONS RESEARCH INSTITUTE, Daejeon (KR)

(72) Inventors: Young Il Kim, Sejong-si (KR); Hyun Kim, Daejeon (KR); Young Sung Son, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/398,918

(22) Filed: Apr. 30, 2019

(65) Prior Publication Data

US 2019/0342395 A1    Nov. 7, 2019

(30) Foreign Application Priority Data

May 3, 2018 (KR) .................. 10-2018-0051105
Apr. 5, 2019 (KR) .................. 10-2019-0040432

(51) Int. Cl.
| | | |
|---|---|---|
| G08B 23/00 | (2006.01) |
| G08B 25/14 | (2006.01) |
| G08B 25/10 | (2006.01) |
| G08B 17/00 | (2006.01) |
| G08B 17/06 | (2006.01) |
| H04L 29/08 | (2006.01) |
| H04W 4/38 | (2018.01) |
| G08B 21/02 | (2006.01) |
| H04W 84/18 | (2009.01) |

(52) U.S. Cl.
CPC .............. *H04L 67/12* (2013.01); *G08B 21/02* (2013.01); *H04W 4/38* (2018.02); *H04W 84/18* (2013.01)

(58) Field of Classification Search
CPC ...................................................... G06N 20/00
See application file for complete search history.

(56) References Cited

U.S. PATENT DOCUMENTS

| 10,042,341 B1 | 8/2018 | Jacob |
| 2006/0124738 A1* | 6/2006 | Wang ................. G06K 7/10079 235/385 |

(Continued)

FOREIGN PATENT DOCUMENTS

| KR | 10-2009-0097407 A | 9/2009 |
| KR | 10-1075511 B1 | 10/2011 |

(Continued)

*Primary Examiner* — Joseph H Feild
*Assistant Examiner* — Pameshanand Mahase
(74) *Attorney, Agent, or Firm* — LRK Patent Law Firm

(57) ABSTRACT

A method and an apparatus for urban infrastructure management using IoT. The method includes receiving sensing data from a plurality of IoT devices installed in the urban infrastructures; determining health states of the urban infrastructures or predicting occurrence of a disaster based on the received sensing data; and transmitting a warning message according to the predicted disaster occurrence to outside. Thus, the urban infrastructures can be managed efficiently, and the disaster occurrence can be predicted accurately.

18 Claims, 6 Drawing Sheets

(56) References Cited

U.S. PATENT DOCUMENTS

2008/0100447 A1* 5/2008 Powell ................. G06K 7/0008
340/572.2
2009/0289812 A1 11/2009 Kim et al.
2016/0314255 A1* 10/2016 Cook ..................... G06N 20/10
2018/0144634 A1* 5/2018 Kim, II ............ G08G 1/096775

FOREIGN PATENT DOCUMENTS

| KR | 10-1765235 B1 | 8/2017 |
| KR | 10-2017-0127080 A | 11/2017 |
| KR | 10-1868115 B1 | 7/2018 |
| KR | 10-1885682 B1 | 8/2018 |

* cited by examiner

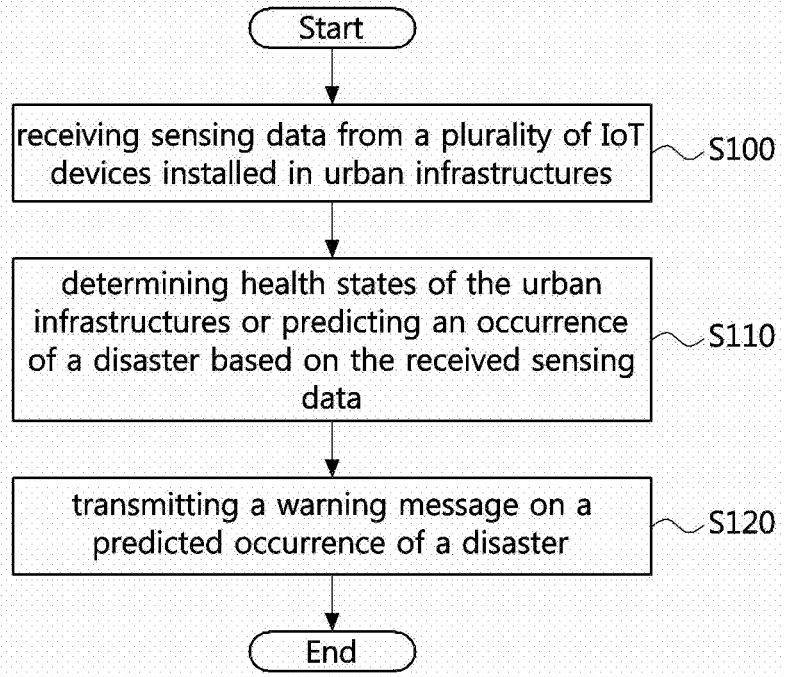
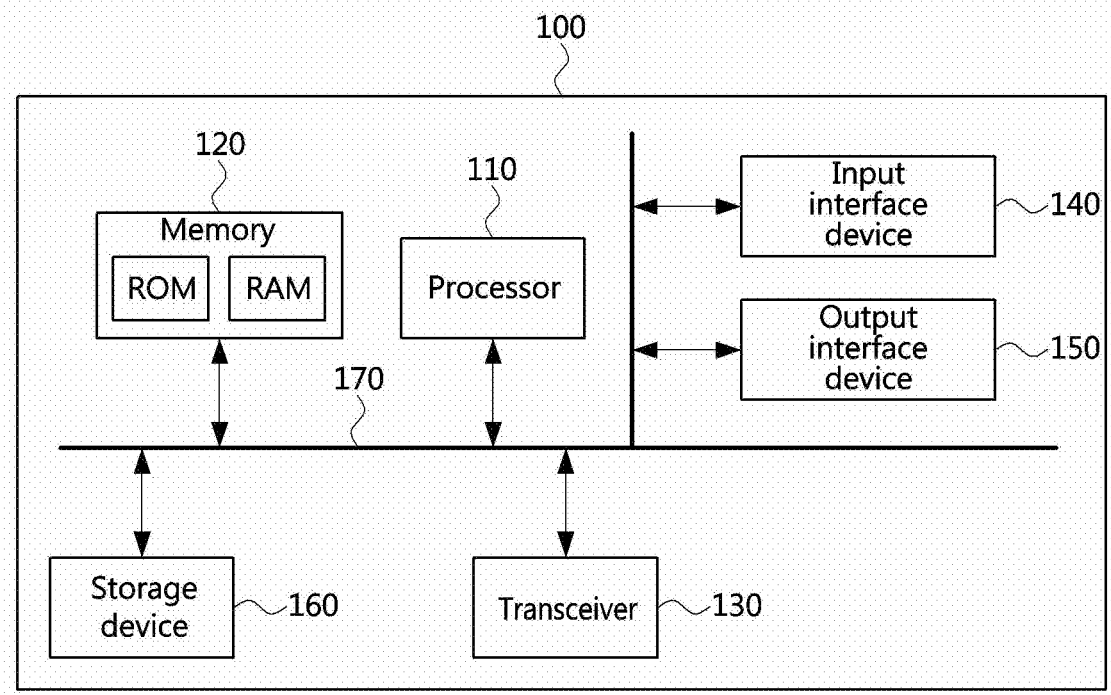

METHOD AND APPARATUS FOR MANAGING URBAN INFRASTRUCTURES USING INTERNET OF THINGS

CROSS-REFERENCE TO RELATED APPLICATIONS

This application claims priority to Korean Patent Applications Nos. 10-2018-0051105, filed May 3, 2018, and 10-2019-0040432, filed Apr. 5, 2019, in the Korean Intellectual Property Office (KIPO), the entire contents of which are hereby incorporated by reference.

BACKGROUND

1. Technical Field

The present disclosure relates to a method and an apparatus for managing urban infrastructures by using Internet of things (IoT), and more specifically, to a method and an apparatus for collecting state information by using IoT sensors installed in the urban infrastructures, and performing maintenance, defect detection, disaster occurrence detection, and the like for the urban infrastructures.

2. Description of Related Art

As urban size continues to expand, the need for management of various urban infrastructures, including tunnels, roads, bridges, and buildings, which are core functions of a city, is increasing. Failure to early detect and repair defects or cracks in such the urban infrastructures may lead to major accidents, such as collapse of bridges and tunnels, traffic accidents caused by road breakage, fire in buildings, and many other physical and personal damages.

Recently, Internet of Things (IoT), a technology that integrates sensors and communication functions into various things and connects them to the Internet, has been extensively researched. The IoT is a technology that connects various things through wireless communication, allows things connected to the Internet to exchange data and provide information analyzed and learned to users, or allows the users remotely control the things. However, simply monitoring states of the urban infrastructures with the IoT makes it difficult to identify the states of the urban infrastructures and estimate a disaster occurrence. Therefore, there is a need for a systematic system for quickly grasping the states of the urban infrastructures, estimating a scale of the disaster, and responding to the disaster.

SUMMARY

Accordingly, embodiments of the present disclosure provide a method for managing urban infrastructures by using IoT.

Accordingly, embodiments of the present disclosure also provide an apparatus for managing urban infrastructures by using IoT.

In order to achieve the objective of the present disclosure, a method for managing urban infrastructures by using IoT may comprise receiving sensing data from a plurality of IoT devices installed in the urban infrastructures; determining health states of the urban infrastructures or predicting occurrence of a disaster based on the received sensing data; and transmitting a warning message according to the predicted disaster occurrence to outside.

The method may further comprise, before the receiving sensing data, classifying the urban infrastructures into categories; generating a standard model for each of the classified categories; and generating information for installing the IoT devices according to the generated standard model.

The standard model may be generated based on at least one of a construction type, a load, a construction time, and a site of the urban infrastructure according to the category.

The generating information for installing may further comprise installing the plurality of IoT devices in the urban infrastructures; calculating correlations among the sensing data received from the plurality of installed IoT devices; determining two or more IoT devices having a low correlation by comparing the calculated correlations with a preconfigured threshold value; and generating the information for installing additional IoT devices in positions between the determined two or more IoT devices.

The receiving sensing data may further comprise receiving the sensing data from a gateway in a wireless sensor network to which the plurality of IoT devices belong.

The receiving sensing data may further comprise receiving from the gateway the sensing data validated based on results of validity determination that the gateway performs on sensing data collected from the plurality of IoT devices.

The receiving sensing data may further comprise receiving from the gateway a result data of counting a number of redundant data among sensing data collected from the plurality of IoT devices.

The receiving sensing data may further comprise receiving a mean value and a variance value, which the gateway calculates for data having a small change rate with time among the sensing data collected from the plurality of IoT devices.

The method may further comprise, after the receiving sensing data, generating management basis data for the plurality of IoT devices by fusing the received sensing data; and remotely controlling the plurality of IoT devices according to the generated management basic data.

The determining or the predicting may further comprise comparing the sensing data with a preconfigure threshold value; and predicting occurrence of a disaster based on a type and a number of the sensing data exceeding the preconfigured threshold value.

In order to achieve the objective of the present disclosure, an apparatus for managing urban infrastructures may comprise at least one processor and a memory storing at least one instruction executed by the at least one processor. Also, the at least one instruction may be configured to receive sensing data from a plurality of IoT devices installed in the urban infrastructures; determine health states of the urban infrastructures or predict occurrence of a disaster based on the received sensing data; and transmit a warning message according to the predicted disaster occurrence to outside.

The at least one instruction may be further configured to, before the receiving of the sensing data, classify the urban infrastructures into categories; generate a standard model for each of the classified categories; and generate information for installing the IoT devices according to the generated standard model.

The standard model may be generated based on at least one of a construction type, a load, a construction time, and a site of the urban infrastructure according to the category.

The at least one instruction may be further configured to, in the generating of the information for installing, install the plurality of IoT devices in the urban infrastructures; calculate correlations among the sensing data received from the plurality of installed IoT devices; determine two or more IoT devices having a low correlation by comparing the calculated correlations with a preconfigured threshold value; and generate the information for installing additional IoT devices in positions between the determined two or more IoT devices.

The at least one instruction may be further configured to, in the receiving of the sensing data, receive the sensing data from a gateway in a wireless sensor network to which the plurality of IoT devices belong.

The at least one instruction may be further configured to, in the receiving of the sensing data, receive from the gateway the sensing data validated based on results of validity determination that the gateway performs on sensing data collected from the plurality of IoT devices.

The at least one instruction may be further configured to, in the receiving of the sensing data, receive from the gateway a result data of counting a number of redundant data among sensing data collected from the plurality of IoT devices.

The at least one instruction may be further configured to, in the receiving of the sensing data, receive a mean value and a variance value, which the gateway calculates for data having a small change rate with time among the sensing data collected from the plurality of IoT devices.

The at least one instruction may be further configured to, after the receiving of the sensing data, generate management basis data for the plurality of IoT devices by fusing the received sensing data; and remotely control the plurality of IoT devices according to the generated management basic data.

The at least one instruction may be further configured to, in the determining or the predicting, compare the sensing data with a preconfigure threshold value; and predict occurrence of a disaster based on a type and a number of the sensing data exceeding the preconfigured threshold value.

Using the methods and apparatuses for managing urban infrastructures by using IoT according to the present disclosure as described above, the states of the urban infrastructures can be monitored quickly and accurately through various IoT devices installed at sophisticated locations. Also, there is an advantage that standardized transportation infrastructures can be constructed so as to make it possible to promptly identify and respond to disaster occurrence and states of the transportation infrastructures. Also, efficiency of data transmission can be improved by eliminating unnecessary data through determination of validity of sensing data.

BRIEF DESCRIPTION OF DRAWINGS

Embodiments of the present disclosure will become more apparent by describing in detail embodiments of the present disclosure with reference to the accompanying drawings, in which:

FIG. 6 is a flowchart illustrating an urban infrastructure management method using IoT according to an embodiment of the present disclosure; and FIG. 7 is a hardware block diagram illustrating an urban infrastructure management apparatus using IoT according to an embodiment of the present disclosure.

DETAILED DESCRIPTION

Figure 1:
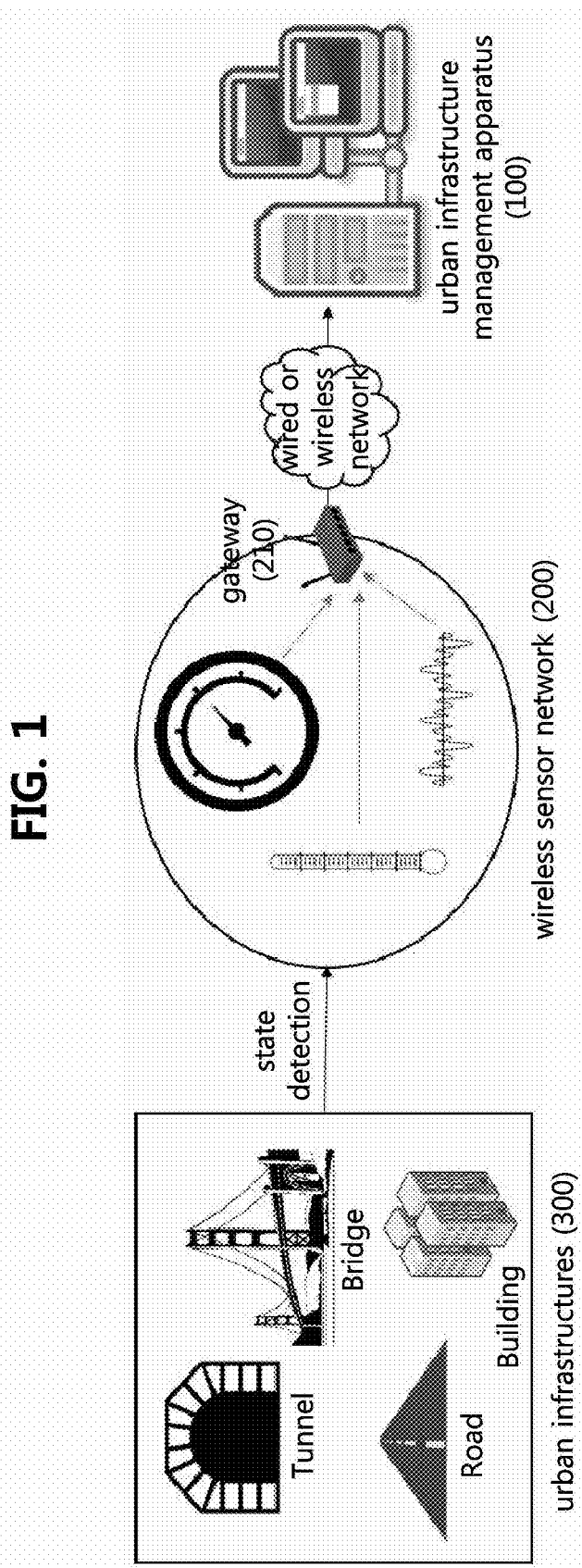
FIG. 1 is a conceptual diagram illustrating an urban infrastructure management system using IoT according to an embodiment of the present disclosure.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, wireless communication networks to which exemplary embodiments according to the present disclosure will be described. However, wireless communication networks to which exemplary embodiments according to the present disclosure are applied are not restricted to what will be described below. That is, exemplary embodiments according to the present disclosure may be applied to various wireless communication networks.

FIG. 1 is a conceptual diagram illustrating an urban infrastructure management system using IoT according to an embodiment of the present disclosure.

Referring to FIG. 1, an urban infrastructure management system using IoT according to an embodiment of the present disclosure may comprise various urban infrastructures 300, a wireless sensor network 200 including a plurality of IoT devices, which are installed in the various urban infrastructures 300 and detect states of the various urban infrastructures 300, and/or an urban infrastructure management apparatus 100 for receiving and controlling various sensing data by interfacing with the wireless sensor network through a wired or wireless network.

The urban infrastructures 300 may include tunnels, bridges, roads, buildings, and the like, which are various structures that perform main functions including transportation, residence, and the like in a city. Hereinafter, the urban infrastructure 300 may be abbreviated as 'urban infras'.

Each of the urban infrastructures 300 may be provided with a plurality of IoT devices that detect vibration, temperature, humidity, atmospheric pressure, or the like and detect the surrounding environment (fog, freezing, heavy rain, etc.). Here, each of the plurality of IoT devices may be a device including one or more sensors and a communication module. For example, an IoT device may be configured to include a vibration sensor, a temperature sensor, and a communication module.

Also, the plurality of IoT devices included in the wireless sensor network 200 may communicate with an external network through a gateway 210. Here, the gateway 210 may transmit and receive sensing data collected by the plurality of IoT devices by communicating with the urban infrastructure management apparatus 100 through the wired or wireless network.

The urban infrastructure management apparatus 100 may collect a plurality of sensing data from the plurality of IoT devices constituting the wireless sensor network 200, and may analyze health states of the urban infrastructures and predict whether a disaster occurs or not. Further, the urban infrastructure management apparatus 100 may schedule maintenance of the urban infrastructures based on the determined health states, and may transmit a warning message on a predicted disaster to the outside (e.g., external network). Also, the urban infrastructure management apparatus 100 may control and manage the IoT devices externally, and generate information for installing IoT devices by modeling the urban infrastructures.

Figure 2:
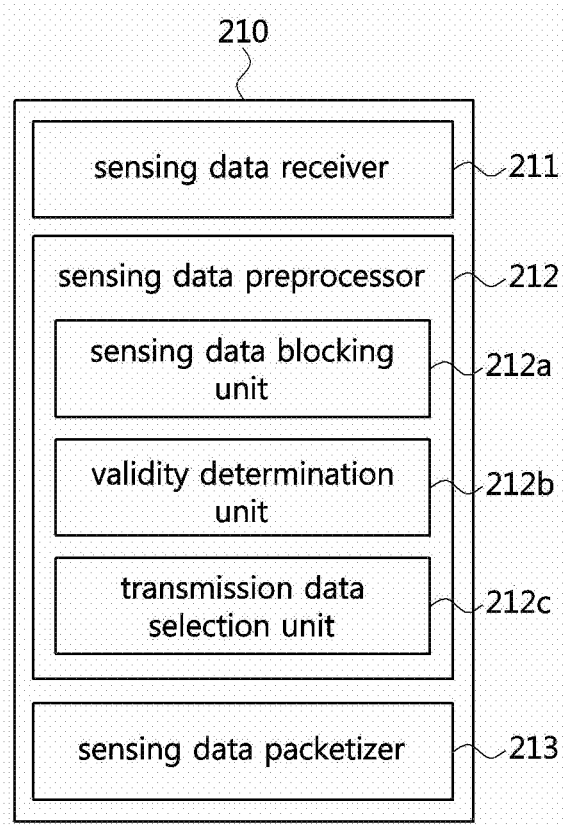
FIG. 2 is a functional block diagram illustrating a configuration of a gateway in a wireless sensor network according to an embodiment of the present disclosure.

FIG. 2 is a functional block diagram illustrating a configuration of a gateway in a wireless sensor network according to an embodiment of the present disclosure.

Referring to FIG. 2, functional blocks of the gateway 210 in the wireless sensor network 200 according to FIG. 1 may be identified. Specifically, the gateway 210 in the wireless sensor network 200 may comprise a sensing data receiver 211 for receiving sensing data from a plurality of IoT devices, a sensing data preprocessor 212 for preprocessing the received sensing data, and/or a sensing data packetizer 213 for packetizing the preprocessed sensing data.

Meanwhile, the sensing data preprocessor 212 may include a sensing data blocking unit 212a, a validity determination unit 212b, and/or a transmission data selection unit 212c.

The sensing data blocking unit 212a may store sensing data received through the sensing data reception unit 211 at predetermined time intervals, and generate data blocks each of which has a predetermined size or length from the received sensing data.

The validity determination unit 212b may determine validity of the data generated by the sensing data blocking unit 212a. Specifically, it may be possible to determine whether a value of the sensing data belongs to a valid data range and to output only validated data.

The transmission data selection unit 212c may select data to be packetized by excluding or processing unnecessary data from the valid data determined through the validity determination unit 212b. For example, when there is data whose value does not change with time among the valid data, the amount of data to be transmitted can be reduced by designating the value and the number of data. Specifically, the transmission data selection unit 212c may calculate a mean value and a variance value for data that need to observe a change rate or the mean value of the valid data, rather than the data values themselves, and select only the calculated value as data to be packetized. Further, the transmission data selection unit 212c may calculate the number of times of duplication of the duplicated data if there is duplicated data, and may select only the calculated value as data to be packetized.

The sensing data packetizer 213 may generate the data selected by the transmission data selection unit 212c as packets, and transmit the generated packets to the outside.

Also, the gateway 210 may remotely reset or perform calibration for the IoT devices that provided the sensing data determined as invalid by the validity determination unit 212b.

Figure 3:
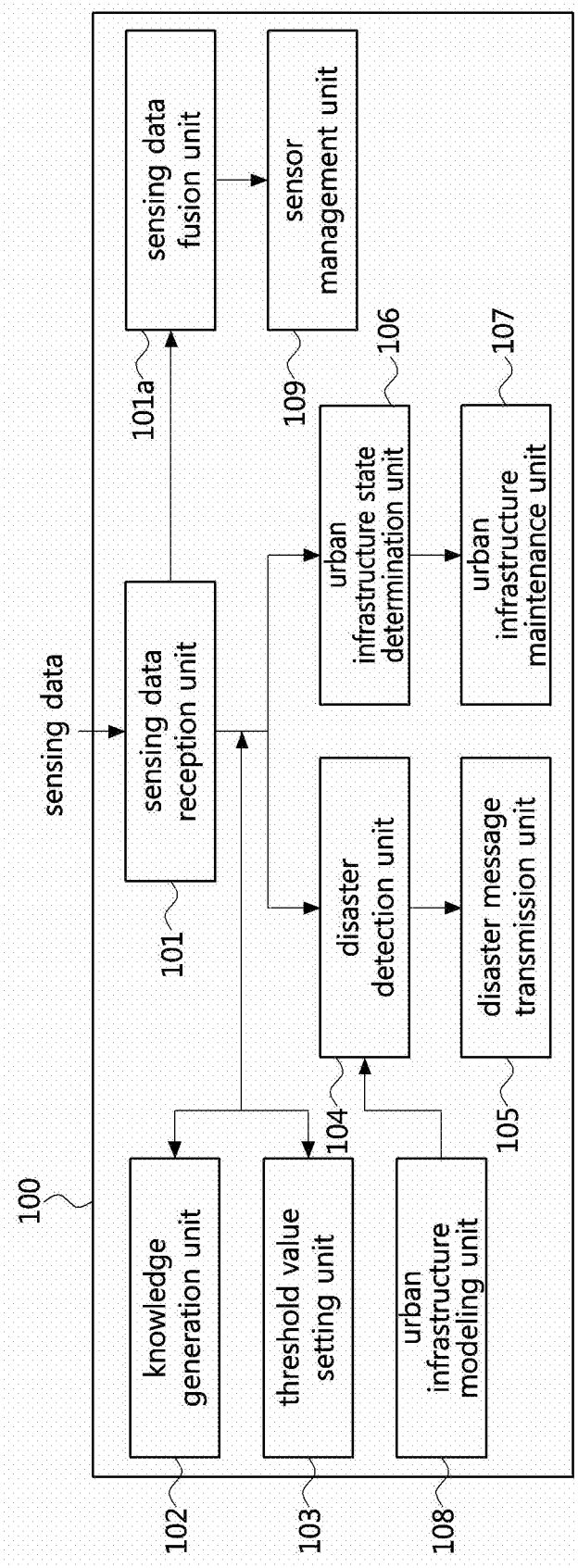
FIG. 3 is a functional block diagram illustrating a configuration of an urban infrastructure management apparatus using IoT according to an embodiment of the present disclosure.

FIG. 3 is a functional block diagram illustrating a configuration of an urban infrastructure management apparatus using IoT according to an embodiment of the present disclosure.

Referring to FIG. 3, the urban infrastructure management apparatus 100 according to an embodiment of the present disclosure may include a sensing data reception unit 101 for receiving sensing data, a disaster detection unit 104 for analyzing the received sensing data, and/or a disaster message transmission unit 105 for transmitting a disaster message for warning and response according to the detected disaster to the outside. The sensing data reception unit 101 may receive the sensing data from the wireless sensor network (more specifically, the gateway of the wireless sensor network), reconfigure the received data into sensing data representing various state information of the urban infrastructures, and classify the sensing data into urban infrastructure data and environmental data according to the type of the sensing data. Here, the urban infrastructure data may be data obtained by sensing the vibration and temperature of the urban infrastructures themselves, and the environmental data may be data obtained by sensing the surrounding environments such as icing or heavy rain of a specific urban infrastructure. The disaster detection unit 104 may analyze the sensing data to predict a probability of occurrence of a disaster in the urban infrastructures, and may estimate a size and a damage of the disaster that is likely to occur. In this case, the disaster detection unit 104 may compare a threshold value configured by a threshold value setting unit 103 with the sensing data, analyze the types and the number of the sensing data exceeding the threshold value, and predict the type and size of the possible disaster. The disaster message transmission unit 105 may generate a warning message including the size and information of the disaster detected by the disaster detection unit 104, and transmit the generated warning message to a disaster response server. Here, the disaster response server may be a control server of an organization responsible for the disaster according to the type of the disaster detected, but may include a user terminal located around the urban infrastructure where the disaster is detected.

The urban infrastructure management apparatus 100 may further include an urban infrastructure state determination unit 106 for analyzing the received sensing data to determine a health state of the urban infrastructure, an urban infrastructure maintenance unit 107 for maintaining and managing the urban infrastructures according to the health states of the urban infrastructures. The urban infrastructure state determination unit 106 may compare the sensing data for each of the urban infrastructures with threshold values configured by the threshold value setting unit 103 to analyze the types and the number of the sensing data exceeding the threshold values and determine the health state of each of the urban infrastructures. In this case, the determined health states may be displayed on a display after being rendered according to risk levels using 3D spatial information about the urban infrastructures. The urban infrastructure maintenance unit 107 may generate scheduling information for maintenance according to the health state of the individual urban infrastructure determined by the urban infrastructure state determination unit 106. For example, the urban infrastructure maintenance unit 107 may generate scheduling information for checking an urban infrastructure with a good health state at a predetermined cycle, and may generate scheduling information for checking an urban infrastructure in a critical state where its health state is above a certain level at a shortened cycle or immediately.

The urban infrastructure management apparatus 100 may further include a knowledge generation unit 102 for continuously collecting and analyzing the received sensing data to generate knowledge for the disaster detection or the health state determination, the threshold value setting unit 130 for setting the threshold values required for the disaster detection or the health state determination, and an urban infrastructure modeling unit 108 for generating standard models for the urban infrastructures. For example, the knowledge generation unit 102 may be configured as a deep learning network that learns the disasters or health states by using the sensing data collected during a certain period of time and the sensing data according to the disasters of the past. Also, the threshold value setting unit 103 may set the threshold values for determining the disaster or health state based on the input received from the user or the learning data of the knowledge generation unit 102. The urban infrastructure modeling unit 108 may define and generate a standard model according to the type of each urban infrastructure, and generate information for installing the IoT device for each generated standard model.

The urban infrastructure management apparatus 100 may further include a sensing data fusion unit 101*a* for generating new data by fusing a plurality of received sensing data, and a sensor management unit 109 for managing and controlling the plurality of IoT devices installed in the urban infrastructures on the basis of the fused sensing data or the received sensing data. Here, the sensing data fusion unit 101*a* may provide information that helps the management of the sensor management unit 109 by determining the frequency of measurement of the sensors, or generating data necessary for determining whether the sensors are additionally installed or redundantly installed.

Figure 4:
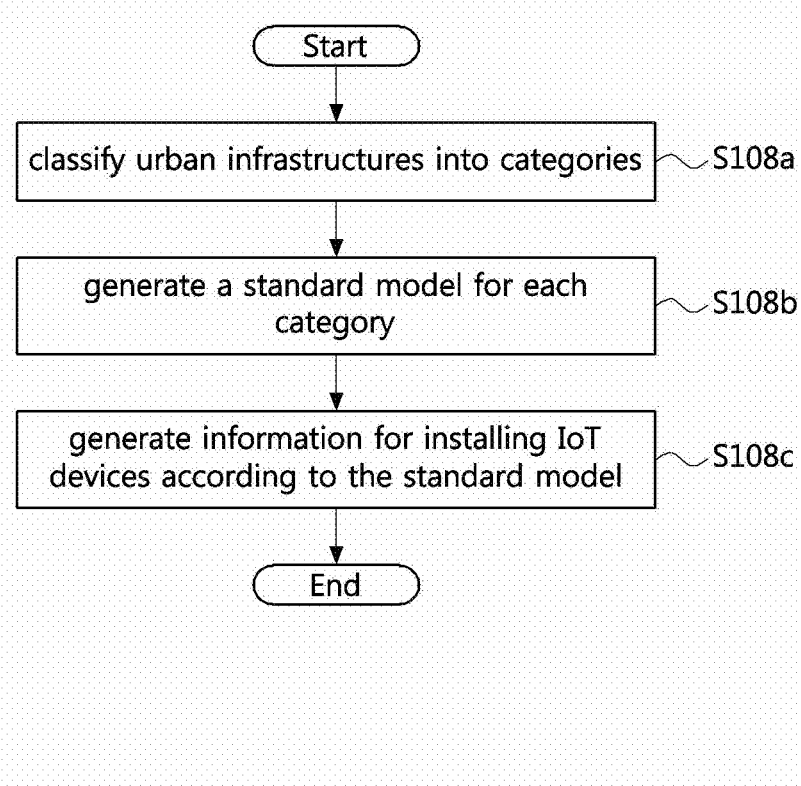
FIG. 4 is a flowchart illustrating an operation of the urban infrastructure modeling unit according to FIG. 3.

FIG. 4 is a flowchart illustrating an operation of the urban infrastructure modeling unit according to FIG. 3.

Referring to FIG. 4, an operation of the urban infrastructure modeling unit 108 according to FIG. 3 may be confirmed. Specifically, the operation method of the urban infrastructure modeling unit 108 of the urban infrastructure management apparatus 100 may include a step S108*a* of classifying the urban infrastructures into categories, a step S108*b* of generating a standard model for each classified category, and a step S108*c* of generating information for installing IoT devices according to the generated standard model.

Here, the categories of the urban infrastructures may include bridges, tunnels, roads, buildings, and the like, and may include additional categories depending on characteristics of various actual urban infrastructures.

In the step S108*b* of generating the standard model, the standard model may be generated by considering construction type, load, construction time (or, period of use), installation site (or, environment surrounding the installation site), and the like of the urban infrastructure according to the classified categories. The information for installing the IoT devices may include the sites and the number of the IoT devices installed in the specific urban infrastructure for each standard model.

In the step S108*c* of generating the information for installing, the information may be generated in an analytical manner according to mechanical criteria, or generated based on correlations of the data collected from the actually-installed IoT devices.

Figure 5:
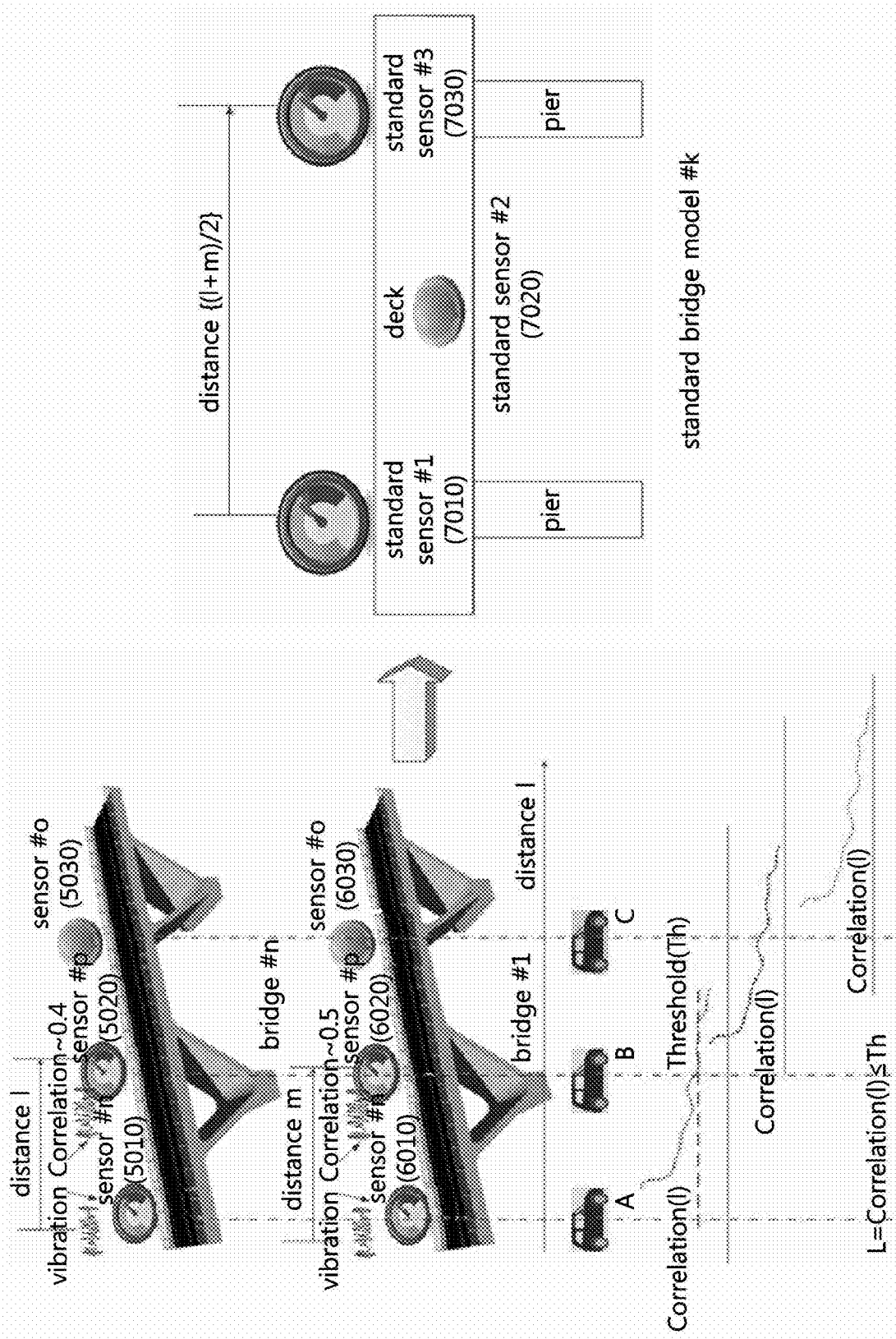
FIG. 5 is a diagram illustrating a method of generating information for installing an IoT device according to an embodiment of the present disclosure.

FIG. 5 is a diagram illustrating a method of generating information for installing an IoT device according to an embodiment of the present disclosure.

Referring to FIG. 5, a method of actually installing and analyzing the IoT devices to generate the information for installing will be described as one of methods for generating the information for installing the IoT devices.

For example, a plurality of vibration sensors (or, IoT devices with vibration sensors) may be installed at arbitrary installation sites with respect to a bridge, and an external environment change such as a traffic passage may be applied to them. In this case, the correlation between the sensing data collected from the plurality of vibration sensors may be calculated, and information for additionally installing IoT devices in positions between sensors having the low correlation may be generated. Also, when the number of sensors having the high correlation is larger than a predetermined number, information for uninstalling some of the highly-correlated sensors may be generated.

Specifically, as shown in the left drawing, a correlation (i.e., correlation 1) between a vibration sensor installed at a point A of a specific bridge # n and a vibration sensor installed at a point B of the specific bridge # n may be calculated according to a distance l therebetween. The correlation may be compared with a predetermined threshold Th. When the correlation is less than or equal to the predetermined threshold, it may be determined that the interval between the installed vibration sensors is sufficiently long. Therefore, in this case, at least one new vibration sensor may be additionally provided between the points A and B, and the correlation between the adjacent vibration sensors may be calculated again and compared with the predetermined threshold.

In FIG. 5, an example, in which the installation sites and the number of the vibration sensors for a bridge standard model # k are determined by using a bridge # n having a correlation value 0.4 of sensing data measured by vibration sensors and a bridge #1 having a correlation of 0.5 of sensing data measured by vibration sensors, may be identified.

As described above, according to an embodiment of the present disclosure, the installation sites and the number of IoT devices may be specified based on the correlation of sensing data measured at the actually-installed IoT devices.

FIG. 6 is a flowchart illustrating an urban infrastructure management method using IoT according to an embodiment of the present disclosure.

Referring to FIG. 6, an urban infrastructure management method using IoT may comprise a step S100 of receiving sensing data from a plurality of IoT devices installed in urban infrastructures, a step S110 of determining health states of the urban infrastructures or predicting an occurrence of a disaster based on the received sensing data, and a step S120 of transmitting a warning message on a predicted occurrence of a disaster. Here, the urban infrastructure management method using IoT may be performed by the urban infrastructure management apparatus 100 according to FIG. 1 and/or FIG. 3.

The method may further comprise, before the step S100 of receiving sensing data, a step of classifying the urban infrastructures into categories, a step of generating a standard model for each classified category, and a step of generating information for installing the IoT devices according to the generated standard model.

The step of generating a standard model may comprise a step of generating the standard model based on at least one of construction type, load, construction time (or, period of use), installation site (or, environment surrounding the installation place), and the like of the urban infrastructures according to the classified categories.

The step of generating information for installing may comprise a step of installing a plurality of IoT devices in the urban infrastructures, a step of calculating correlations among sensing data received from the plurality of installed IoT devices, a step of determining two or more IoT devices having a low correlation by comparing the calculated correlations with a preconfigure threshold value, and a step of generating information for installing at least one additional IoT device for a position between the determined IoT devices.

The step S100 of receiving sending data may comprise receiving the sensing data from a gateway of a wireless sensor network to which the plurality of IoT devices belong.

The step S100 of receiving sensing data may comprise receiving only validated data based on a result of the gateway determining validity of the sensing data collected from the plurality of IoT devices. The step S100 of receiving sensing data may comprise receiving resultant data obtained by calculating the number of redundant data among the sensing data collected from the plurality of IoT devices by the gateway. The step S100 of receiving sensing data may comprise receiving a mean value and a variance value of the sensing data collected from the plurality of IoT devices with respect to the sensing data having a small rate of change with time in the gateway.

The method may further comprise, after the step S100 of receiving sensing data, a step of generating management basis data for the plurality of IoT devices by fusing the received sensing data, and a step of remotely controlling the plurality of IoT devices according to the generated management basis data.

The step S110 of determining health states of the urban infrastructures or predicting an occurrence of a disaster may comprise a step of comparing the sensing data with a preconfigured threshold value, and a step of predicting an occurrence of a disaster based on the type and the number of sensing data exceeding the threshold value.

FIG. 7 is a hardware block diagram illustrating an urban infrastructure management apparatus using IoT according to an embodiment of the present disclosure.

Referring to FIG. 7, the urban infrastructure management apparatus 100 using IoT may comprise at least one processor 110 and a memory 120 storing at least one instruction causing the at least one processor 110 to perform at least one step.

Also, the apparatus 100 may further include a transceiver 130 that performs communication through a wired or wireless network. The urban infrastructure management apparatus 100 using IoT may further include an input interface device 140, an output interface device 150, a storage device 160, and the like. Each component included in the urban infrastructure management apparatus 100 using IoT may be connected by a bus 170 to perform communications with each other.

Here, each of the at least one processor 110 may refer to a central processing unit (CPU), a graphics processing unit (GPU), or a dedicated processor on which methods according to embodiments of the present disclosure are performed. Each of the memory 120 and the storage device 160 may be constituted of at least one of a volatile storage medium and a nonvolatile storage medium. For example, the memory 120 may comprise at least one of a read only memory (ROM) and a random access memory (RAM).

Here, the at least one step may comprise a step of receiving sensing data from a plurality of IoT devices installed in urban infrastructures, a step of determining health states of the urban infrastructures or predicting an occurrence of a disaster based on the received sensing data, and a step of transmitting a warning message on a predicted occurrence of a disaster.

Also, the at least one step may further comprise, before the step of receiving sensing data, a step of classifying the urban infrastructures into categories, a step of generating a standard model for each classified category, and a step of generating information for installing the IoT devices according to the generated standard model.

The step of generating a standard model may comprise a step of generating the standard model based on at least one of construction type, load, construction time (or, period of use), installation site (or, environment surrounding the installation place), and the like of the urban infrastructures according to the classified categories.

The step of generating information for installing may comprise a step of installing a plurality of IoT devices in the urban infrastructures, a step of calculating correlations among sensing data received from the plurality of installed IoT devices, a step of determining two or more IoT devices having a low correlation by comparing the calculated correlations with a preconfigure threshold value, and a step of generating information for installing at least one additional IoT device for a position between the determined IoT devices.

The step of receiving sending data may comprise receiving the sensing data from a gateway of a wireless sensor network to which the plurality of IoT devices belong.

The step of receiving sensing data may comprise receiving only validated data based on a result of the gateway determining validity of the sensing data collected from the plurality of IoT devices. The step of receiving sensing data may comprise receiving resultant data obtained by calculating the number of redundant data among the sensing data collected from the plurality of IoT devices by the gateway. The step of receiving sensing data may comprise receiving a mean value and a variance value of the sensing data collected from the plurality of IoT devices with respect to the sensing data having a small rate of change with time in the gateway.

The at least one step may further comprise, after the step of receiving sensing data, a step of generating management basis data for the plurality of IoT devices by fusing the received sensing data, and a step of remotely controlling the plurality of IoT devices according to the generated management basis data.

The step of determining health states of the urban infrastructures or predicting an occurrence of a disaster may comprise a step of comparing the sensing data with a preconfigured threshold value, and a step of predicting an occurrence of a disaster based on the type and the number of sensing data exceeding the threshold value.

The apparatus 100 for managing urban infrastructures using IoT may be implemented as, for example, a desktop computer, a laptop computer, a notebook, a smart phone, a tablet PC, a mobile phone, a smart watch, a smart phone, a portable multimedia player (PMP), a portable game machine, a navigation device, a digital camera, a digital multimedia broadcasting (DMB) player, a digital audio recorder, a digital audio player, a digital video recorder, a digital video player, a personal digital assistant (PDA), or the like, which has a communication capability.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A method for managing urban infrastructures by using Internet of Thing (IoT) installed in the urban infrastructures, the method comprising:
   classifying the urban infrastructures into categories including bridges, tunnels, roads, and buildings;
   generating standard models for each of the classified categories;
   generating installation information for IoT devices according to the generated standard models;
   receiving sensing data from the IoT devices;
   determining health states of the urban infrastructures or predicting disaster occurrence based on the received sensing data; and
   sending out a warning message according to the predicted disaster occurrence,
   wherein the installation information for the IoT devices includes information about installation sites and a number of the IoT devices installed in an urban infrastructure for each standard model.

2. The method according to claim 1, wherein the standard model is generated based on at least one of a construction type, a load, a construction time, and an installation site of the urban infrastructure according to the category.

3. The method according to claim 1, wherein the generating installation information further comprises:
   installing the IoT devices in the urban infrastructures;
   calculating correlations of the sensing data to one another, which are received from the IoT devices;
   determining two or more of the IoT devices, which have a low correlation, by comparing the calculated correlations with a preconfigured threshold value; and
   generating the installation information for additional IoT devices at positions between the determined two or more IoT devices.

4. The method according to claim 1, wherein the receiving sensing data further comprises receiving the sensing data from a gateway in a wireless sensor network to which the IoT devices belong.

5. The method according to claim 4, wherein the receiving sensing data further comprises receiving from the gateway the sensing data validated based on results of validity determination that the gateway performs on sensing data collected from the IoT devices.

6. The method according to claim 4, wherein the receiving sensing data further comprises receiving from the gateway a result data of counting a number of redundant data among sensing data collected from the IoT devices.

7. The method according to claim 5, wherein the receiving sensing data further comprises receiving a mean value and a variance value, which are calculated by the gateway for sensing data having a small change rate with time among the sensing data collected from the IoT devices.

8. The method according to claim 1, further comprising, after the receiving sensing data,
   generating management basis data for the IoT devices by fusing the received sensing data; and
   remotely controlling the IoT devices according to the generated management basic data.

9. The method according to claim 1, wherein the determining or the predicting further comprises:
   comparing the sensing data with a preconfigure threshold value; and
   predicting disaster occurrence based on a type and a number of the sensing data exceeding the preconfigured threshold value.

10. An apparatus for managing urban infrastructures by using Internet of Thing (IoT) installed in the urban infrastructures, the apparatus comprising at least one processor and a memory storing at least one instruction executed by the at least one processor, wherein the at least one instruction is configured to:

classify the urban infrastructures into categories including bridges, tunnels, roads, and buildings;

generate standard models for each of the classified categories;

generate installation information for IoT devices according to the generated standard models;

receive sensing data from the IoT devices;

determine health states of the urban infrastructures or predict disaster occurrence based on the received sensing data; and sending out a warning message according to the predicted disaster occurrence, wherein the installation information for the IoT devices includes information about installation sites and a number of the IoT devices installed in an urban infrastructure for each standard model.

11. The apparatus according to claim 10, wherein the standard model is generated based on at least one of a construction type, a load, a construction time, and an installation site of the urban infrastructure according to the category.

12. The apparatus according to claim 10, wherein the at least one instruction is further configured to, in the generating of the installation information, install the IoT devices in the urban infrastructures;

calculate correlations of the sensing data to one another, which are received from the IoT devices;

determine two or more of the IoT devices, which have a low correlation, by comparing the calculated correlations with a preconfigured threshold value; and generate the installation information for additional IoT devices at positions between the determined two or more IoT devices.

13. The apparatus according to claim 10, wherein the at least one instruction is further configured to, in the receiving of the sensing data, receive the sensing data from a gateway in a wireless sensor network to which the IoT devices belong.

14. The apparatus according to claim 13, wherein the at least one instruction is further configured to, in the receiving of the sensing data, receive from the gateway the sensing data validated based on results of validity determination that the gateway performs on sensing data collected from the IoT devices.

15. The apparatus according to claim 13, wherein the at least one instruction is further configured to, in the receiving of the sensing data, receive from the gateway a result data of counting a number of redundant data among sensing data collected from the IoT devices.

16. The apparatus according to claim 14, wherein the at least one instruction is further configured to, in the receiving of the sensing data, receive a mean value and a variance value, which are calculated by the gateway for sensing data having a small change rate with time among the sensing data collected from the IoT devices.

17. The apparatus according to claim 10, wherein the at least one instruction is further configured to, after the receiving of the sensing data, generate management basis data for the IoT devices by fusing the received sensing data; and remotely control the IoT devices according to the generated management basic data.

18. The apparatus according to claim 10, wherein the at least one instruction is further configured to, in the determining or the predicting, compare the sensing data with a preconfigure threshold value; and predict disaster occurrence based on a type and a number of the sensing data exceeding the preconfigured threshold value.

* * * * *